United States Patent [19]

Takanashi et al.

[11] Patent Number: 5,214,457

[45] Date of Patent: May 25, 1993

[54] REFLECTIVE OVERHEAD PROJECTOR WITH LIGHT-TO-LIGHT CONVERTER

[75] Inventors: Itsuo Takanashi, Kamakura; Shintaro Nakagaki, Miura; Tsutou Asakura; Masato Furuya, both of Yokohama; Yoshihisa Koyama, Yokosuka; Yuji Uchiyama, Chigasaki, all of Japan

[73] Assignee: Victor Company of Japan, Ltd., Yokohama, Japan

[21] Appl. No.: 707,508

[22] Filed: May 30, 1991

[30] Foreign Application Priority Data

May 31, 1990 [JP] Japan .................. 2-143995

[51] Int. Cl.⁵ ............................. G03B 21/28
[52] U.S. Cl. ...................... 353/31; 353/33; 353/37; 353/122; 359/72
[58] Field of Search ............... 353/30, 31, 33, 37, 353/63, 64, 65, 66, 89, 88, 122; 359/72; 355/44, 45

[56] References Cited

U.S. PATENT DOCUMENTS

| | | | |
|---|---|---|---|
| 3,912,386 | 10/1975 | Gorog et al. | 353/122 |
| 3,945,721 | 3/1976 | Corcoran | 353/122 |
| 4,060,316 | 11/1977 | Pollack et al. | 359/72 |
| 4,389,096 | 6/1983 | Hori et al. | 359/72 |
| 4,392,719 | 7/1983 | Sekimoto | 359/72 |
| 4,481,531 | 11/1984 | Warde et al. | 359/72 |
| 4,850,675 | 7/1989 | Hatanaka et al. | 359/72 |
| 5,009,490 | 4/1991 | Kouno et al. | 359/72 |
| 5,039,209 | 8/1991 | Takanashi et al. | 359/72 |
| 5,054,892 | 10/1991 | Takanashi et al. | 359/72 |
| 5,071,230 | 12/1991 | Hatano et al. | 359/72 |
| 5,071,231 | 12/1991 | Armitage et al. | 359/72 |

FOREIGN PATENT DOCUMENTS

| | | |
|---|---|---|
| 138454 | 4/1985 | European Pat. Off. . |
| 2593295 | 7/1987 | France . |
| 2-48112 | 2/1990 | Japan . |
| 2-51288 | 2/1990 | Japan . |
| 2-97260 | 4/1990 | Japan . |
| 2-130499 | 5/1990 | Japan . |
| 2-246716 | 10/1990 | Japan . |
| 2207772 | 2/1989 | United Kingdom ................ 353/29 |

OTHER PUBLICATIONS

Patent Abstracts of Japan, vol. 13, No. 527 (P-965) (3875) Nov. 24, 1989, & JP-A-01 216332 (Toshiba) Aug. 30, 1989.

Primary Examiner—William A. Cuchlinski, Jr.
Assistant Examiner—William C. Dowling
Attorney, Agent, or Firm—Lowe, Price, LeBlanc & Becker

[57] ABSTRACT

An overhead projector for projecting an image onto a screen includes a light-to-light converter for recording an image therein and reproducing the recorded image therefrom. A first light source applies first light to read an image from a subject copy and record the image in the light-to-light converter under a first light applying condition. A second light source applies second light to reproduce the recorded image from the light-to-light converter and project the reproduced image onto a screen under a second light applying condition independent of the first light applying condition.

9 Claims, 6 Drawing Sheets

REFLECTIVE OVERHEAD PROJECTOR WITH LIGHT-TO-LIGHT CONVERTER

BACKGROUND OF THE INVENTION

1. Field of the Invention

The present invention relates to an overhead projector (OHP), and more particularly to an overhead projector of the reflective type for reading subject copies based on reflections therefrom of light applied thereto.

2. Description of the Prior Art

As is well known in the art, conventional overhead projectors apply light to a subject copy, detect the light transmitted through or reflected by the illuminated subject copy, and project an image represented by the detected light onto a screen. The subject copy is read and its image is projected onto the screen, using a single light source. Therefore, the light source should have output power settings that meet requirements for best qualities in both the reading of the subject copy and the projection of the image.

Subject copies whose images are to be projected are available in a wide range of different qualities or conditions. Some subject copies carry images of low contrast, have colored backgrounds, and are reflective of light. Therefore, the light source of an overhead projector may not provide desired illumination for every subject copy, and the overhead project may possibly be used to project images under undesirable illuminating conditions. For example, if the light source of an overhead projector is adjusted for better contrast of an image read from a subject copy, then the brightness of the image projected onto the screen may be lowered.

Most earlier overhead projectors are designed only to display subject copy images, but not to print, electronically store, and process the information contained in the projected images. However, recent opportunities for presentations using overhead projectors often pose demands for overhead projectors which can print projected images immediately at sites where they are projected, or which can process projected images with the aid of a computer.

SUMMARY OF THE INVENTION

It is an object of the present invention to provide an overhead projector which can project or display high-quality images of objects in a variety of quality or condition ranges, and allows projected or displayed images to be utilized in a wide range of applications.

According to the present invention, there is provided an overhead projector for projecting an image onto a screen, comprising a light-to-light converter for recording an image therein and reproducing the recorded image therefrom, first means for applying first light to read an image from an object and record the image in the light-to-light converter under a first light applying condition, and second means for applying second light to reproduce the recorded image from the light-to-light converter and project the reproduced image onto a screen under a second light applying condition independent of the first light applying condition.

The first means comprises a first light source for emitting the first light under the first light applying condition, a first beam splitter for reflecting the first light to the object, and a first optical system for applying the first light reflected by the object to the light-to-light converter, and wherein the second means comprises a second light source for emitting the second light under the second light applying condition, a second beam splitter for passing the second light therethrough to the light-to-light converter, and a second optical system for applying the second light reflected by the light-to-light converter and the second beam splitter to the screen.

The overhead projector also includes color separating means for separating the first light from the first optical system into lights of different colors before they are applied to the light-to-light converter, and color combining means for combining the lights of different colors from the light-to-light converter into the second light before it is applied to the screen.

The overhead projector further includes reading means for reading the recorded image from the light-to-light converter, data processing means for processing the image read by the reading means, and recording means for recording the image processed by the data processing means in the light-to-light converter.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
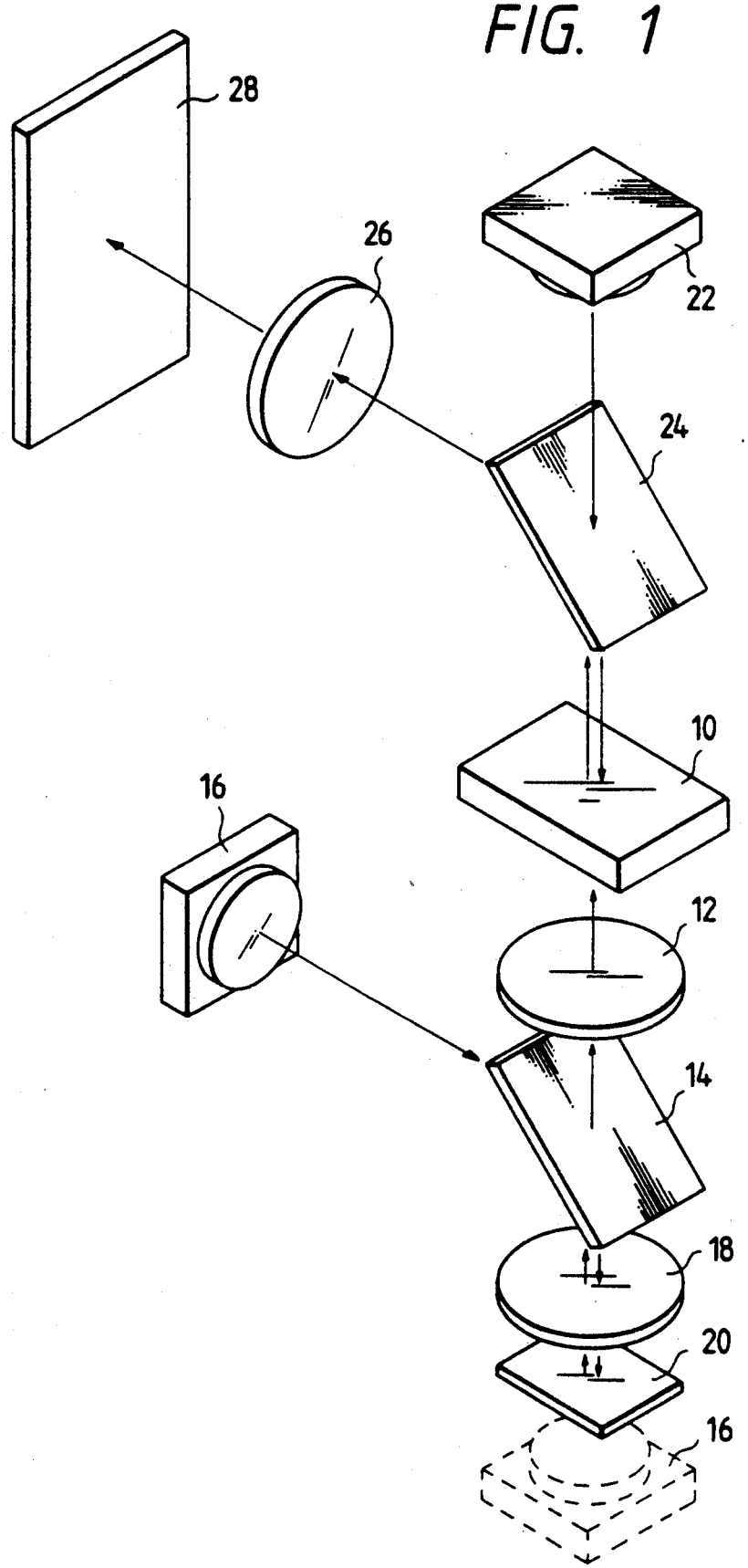
FIG. 1 is a schematic perspective view of an overhead projector according to a first embodiment of the present invention.

Like or corresponding reference numerals denote like or corresponding parts throughout views.

Figure 2:
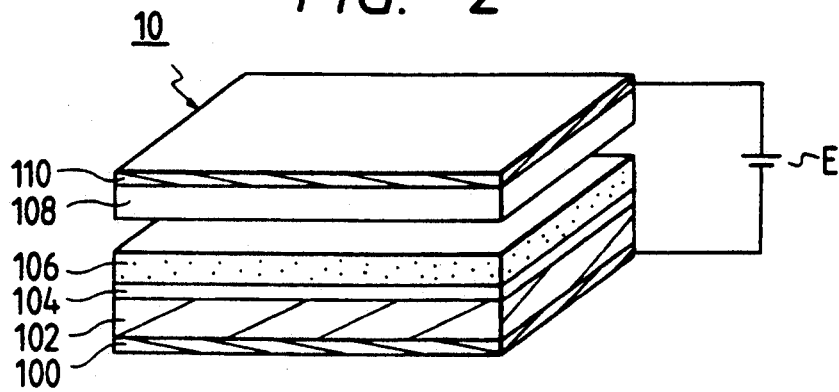
FIG. 2 is a perspective view of a light-to-light converter in the overhead projector shown in FIG. 1.

FIGS. 1 and 2 show an overhead projector according to a first embodiment of the present invention.

As shown in FIG. 1, the overhead projector includes a light-to-light converter 10, an optical system 12 such as a lens disposed on one side of the light-to-light converter 10, and a beam splitter 14 disposed on one side of the lens 12 remotely from the light-to-light converter 10. Writing light is applied to the beam splitter 14 by an image-writing light source 16. An optical system 18 such as a lens is disposed on one side of the beam splitter 14 where writing light from the light source 16 is reflected by the beam splitter 14. An object 20 such as a subject copy, whose image is to be projected by the overhead projector, is disposed on one side of the lens 18 remotely from the beam splitter 14.

The overhead projector also includes a beam splitter 24 disposed on one side of the light-to-light converter 10 remotely from the beam splitter 14. Reading light is applied to the beam splitter 24 by an image reading light source 22. Reading light which is reflected by the light-to-light converter 10 is reflected by the beam splitter 24, and is projected through an optical system 26 such as a lens onto a screen 28.

The light-to-light converter 10 is shown in detail in FIG. 2. The light-to-light converter 10 has a laminated structure which comprises a transparent electrode 100, a photoconductive layer 102, a dielectric mirror 104, a charge storage layer 106 as a recording layer, a light modulating layer 108, and a transparent electrode 110. The charge storage layer 106 and the light modulating layer 108 are spaced from each other. A suitable drive voltage is applied between the transparent electrodes 100, 110 by a power supply E. The light modulating layer 108 may be of a liquid crystal, a high polymer-liquid crystal compound membrane which functions as a memory, or a frost whose surface configuration varies depending on an electric field applied thereto.

When an optical image is projected onto the light-to-light converter 10, the electric conductivity or resistance of the photoconductive layer 102 varies depending on the intensity of the optical image, and an electric charge image corresponding to the projected optical image is formed in the charge storage layer 106 under the voltage applied between the transparent electrodes 100, 110. In this manner, image information is written in the light-to-light converter 10.

An electric field produced by the electric charge image stored in the charge storage layer 106 is applied to the light modulating layer 108 which faces the charge storage layer 106. Therefore, the transmittance of light in the light modulating layer 108 has a distribution corresponding to the electric field distribution thereof, i.e., the optical image projected onto the light-to-light converter 10. When reading light is then applied to the light modulating layer 108, the reading light is modulated by the light modulating layer 108 depending on the light transmittance distribution therein. The reading light is reflected out of the light-to-light converter 10 by the dielectric mirror 104. Thus, the image information stored in the light-to-light converter 10 is read out.

For more details about the light-to-light converter 10, reference should be made to Japanese Patent Applications Nos. 2-48112, 2-51288, 2-97260, 2-130499, and 2-246716, for example.

Operation of the overhead projector shown in FIGS. 1 and 2 will be described below.

To write an image of the object 20 in the light-to-light converter 10, writing light is applied to the light-to-light converter 10 by the light source 16. More specifically, writing light produced by the light source 16 is reflected by the beam splitter 14 and passes through the lens 18 to the object 20. The reading light is then reflected by the object 20, bearing the image thereof, and transmitted through the lens 18, the beam splitter 14, and the lens 12 to the light-to-light converter 10. The image of the object 20 is now recorded in the light-to-light converter 10 in the manner described above.

The image written in the light-to-light converter 10 is read when reading light is applied to the light-to-light converter 10 by the light source 22. More specifically, the reading light produced by the light source 22 passes through the beam splitter 24 to the light-to-light converter 10, and is then modulated thereby depending on the recorded image in the manner described above. The modulated reading light is reflected by the beam splitter 24, and then projected onto the screen 28 through the lens 26. Therefore, the image of the object 20 is projected onto the screen 28.

In the illustrated embodiment, the image of the object 20 is read by the writing light emitted from light source 16, and the recorded image is projected onto the screen 28 by the reading light emitted from the light source 22. Since the different light sources 16, 22 are employed to record and project images, different light emission or illumination settings may be established separately for the writing light which is used to read the image of the object 20 and write the image in the light-to-light converter 10, and for the reading light which is used to read the stored image from the light-to-light converter 10 and project the image onto the screen 28.

More specifically, when an image is to be written in the light-to-light converter 10, light emission or illumination settings with respect to light intensity, frequency, and polarization, for example, depending on the qualities of the object 20, are selected for the light source 16 particularly in order to give more weight to contrast than to brightness of the image. When a recorded image is to be projected onto the screen 28, light emission or illumination settings for those parameters in view of the material of the screen 28 and the lighting conditions in the room in which the overhead projector is used, are selected for the light source 22 for better projected image quality.

The independently established light emission or illumination settings for the light sources 16, 22 allow images of good quality to be projected onto the screen 28 irrespectively of the qualities of the object 20 and the screen 28 and the conditions in which they are used.

According to a modification, writing light from the light source 16 may be applied directly to the object 20 without the intermediary of the beam splitter 14, and light reflected by the object 20 may be applied to the light-to-light converter 10 through the lens 12. According to another alternative, when the image of the object 20 is to be read by reading light transmitted therethrough, but not reflected thereby, the light source 16 is positioned as indicated by the broken lines in FIG. 1 so that reading light emitted thereby passes through the object 20 to the lens 18 and then the light-to-light converter 10. In this case, the beam splitter 14 may be dispensed with, and the lenses 12, 18 may be combined into a single lens.

Figure 3:
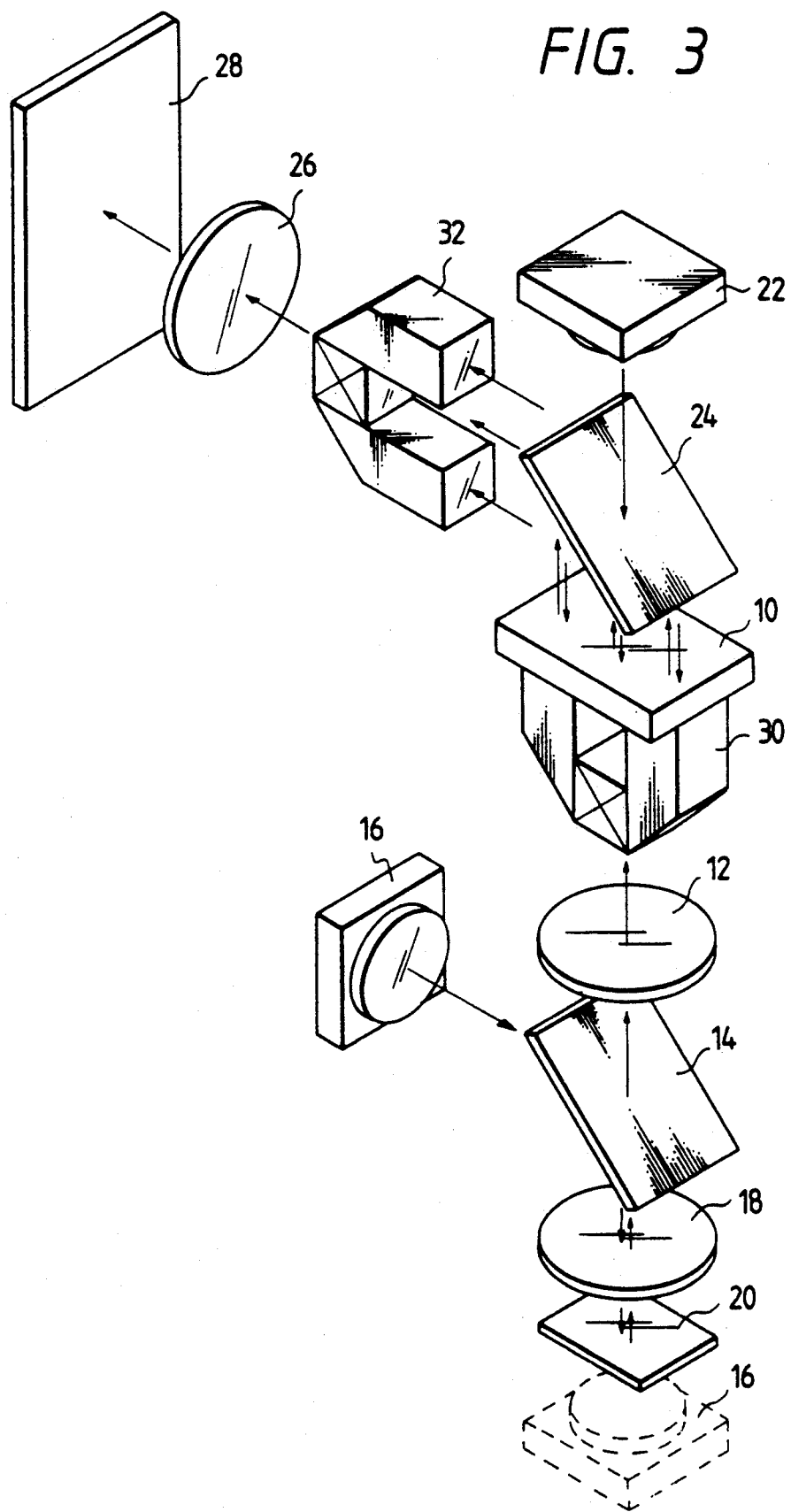
FIG. 3 is a schematic perspective view of an overhead projector according to a second embodiment of the present invention.

FIG. 3 shows an overhead projector according to a second embodiment of the present invention. The overhead projector shown in FIG. 3 is designed for displaying or projecting colored images.

The overhead projector according to the second embodiment is different from the overhead projector according to the first embodiment in that a color separator prism 30 is disposed on the side of the light-to-light converter 10 which faces the lens 12, and a color combining prism 32 is disposed on the side of the beam splitter 24 which faces the lens 26 and hence the screen 28. A colored image of the object 20 is separated into images of primary colors of R (red), G (green), B (blue), for example, by the color separator prism 30, and the primary color images are written in respective different regions in the light-to-light converter 10. The primary color images that are read from the light-to-light converter 10 are combined by the color combining prism 32 into a colored image, which is then projected onto the screen 28. For details about the color separator prism 30 and the color combining prism 32, reference should also be made to the Japanese Patent Application referred to above.

In the second embodiment, light emission or illumination settings can independently be established for the light sources 16, 22 for best colored image quality as with the first embodiment.

The prisms 30, 32 may be replaced with mirrors and prisms for separating a colored image into primary color images and combining primary color images into a colored image.

Figure 4:
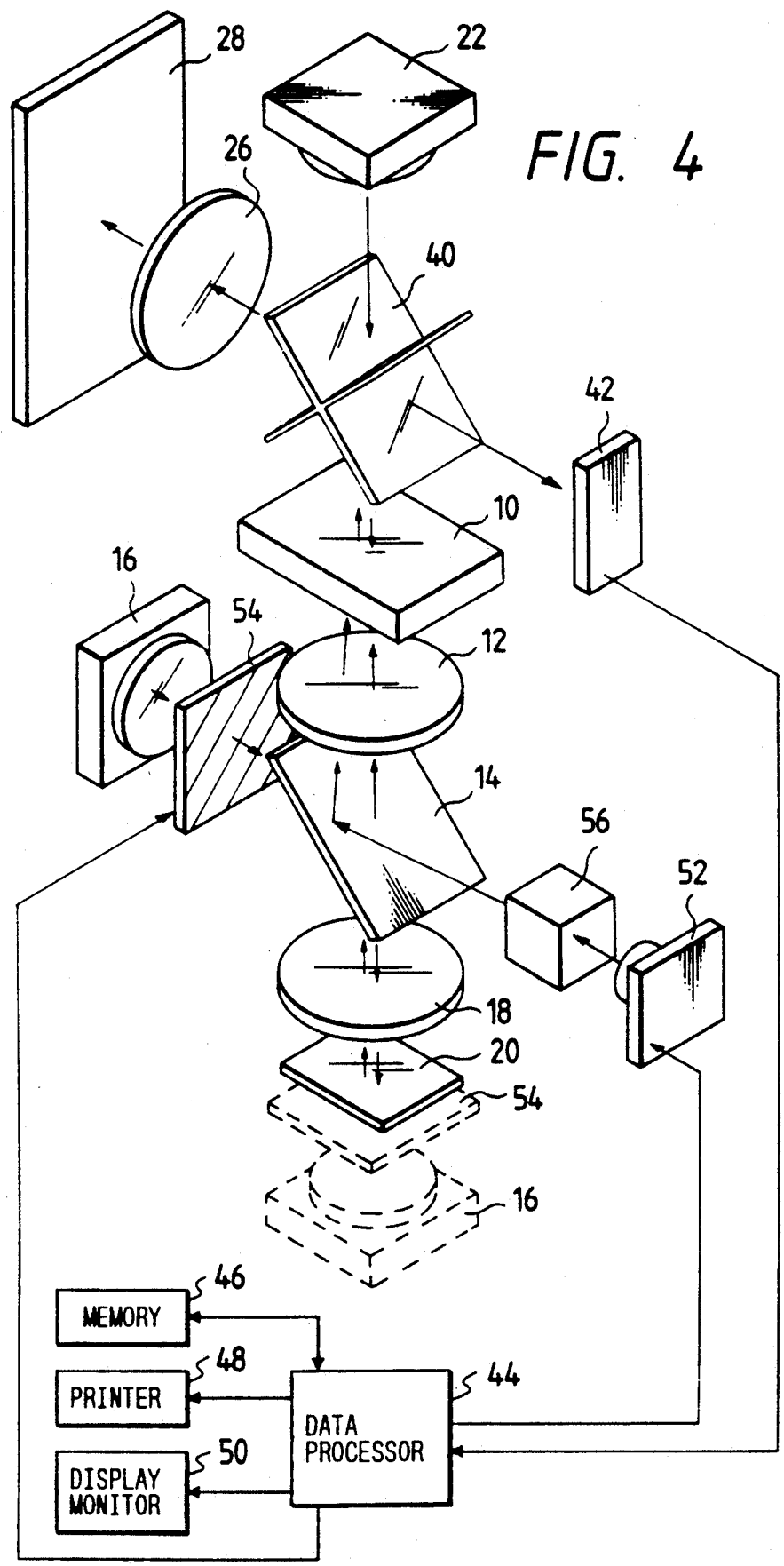
FIG. 4 is a schematic perspective view of an overhead projector according to a third embodiment of the present invention.

FIG. 4 shows an overhead projector according to a third embodiment of the present invention. The overhead projector according to the third embodiment is capable of using projected images in various applications.

As shown in FIG. 4, the overhead projector has major components identical to those of the overhead projector shown in FIG. 1. However, a beam splitter 40 is disposed in place of the beam splitter 24 between the light source 22 and the light-to-light converter 10. The beam splitter 40 reflects modulated light from the light-to-light converter 10 toward the screen 28 and also toward a read unit 42.

The read unit 42 has an output terminal connected to an input terminal of a data processor 44, to which a memory 46, a printer 48, a display monitor 50, a write unit 52, and a shutter 54 are connected. The write unit 52 emits a light beam to be applied to the beam splitter 14. A light deflector 56 is positioned between the write unit 52 and the beam splitter 14, for deflecting the light beam from the write unit 52 and applying the deflected light beam to the beam splitter 14. The beam splitter 14 applies the light beam, as it is deflected, to the light-to-light converter 10, thereby two-dimensionally scanning the light-to-light converter 10. The shutter 54 is disposed between the light source 16 and the beam splitter 14, and can selectively be activated or inactivated by the data processor 44 to stop writing an image in the light-to-light converter 10.

The overhead projector shown in FIG. 4 operates as follows: The basic image projecting operation of the overhead projector shown in FIG. 4 is the same as the operation of the overhead projector shown in FIG. 1. In addition, the same image as the image projected onto the screen 28 is read by the read unit 42, and transmitted to the data processor 44. The data processor 44 may store the image data in the memory 46, print the image data on the printer 48, and display the image data on the display monitor 50.

Furthermore, the image read by the read unit 42 may be written in the light-to-light converter 10 by the write unit 52 under the control of the data processor 44. At the same time, an image of another object which is different from the image that is written in the light-to-light converter 10 by the write unit 52, may be written in the light-to-light converter 10 by the light source 16. Therefore, the images written by the write unit 52 and the light source 16 may be projected in a superimposed fashion onto the screen 28. Alternatively image based on image data from another source and written by the write unit 52, and the image of the object 20 may also be projected in a superimposed manner onto the screen 28.

When the shutter 54 is inactivated by the data processor 44 to block the writing light emitted by the light source 16, only the image which is written in the light-to-light converter 10 by the write unit 52 may be projected onto the screen 28.

The principles of the second embodiment for various image data processing may be incorporated in the overhead projector shown in FIG. 3. The shutter 54 shown in FIG. 4 may be a mechanical shutter or a liquid crystal shutter. The image to be read by the read unit 42 may be an image before it is modulated by the light-to-light converter 10, or an image after it is modulated by the light-to-light converter 10.

The reading unit 42 may be a known area sensor or linear sensor in the form of an image pickup tube, a CCD, or the like for reading an image by linearly or two-dimensionally scanning the same.

Figure 5:
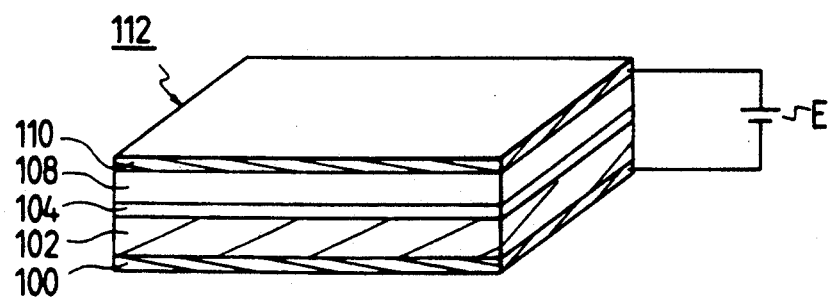
FIGS. 5 and 6 are perspective views of different light-to-light converters.

FIG. 5 shows a different light-to-light converter that can be used in the overhead projectors according to the present invention. The light-to-light converter, generally indicated by the reference numeral 112 in FIG. 5, has a laminated structure which comprises a transparent electrode 100, a photoconductive layer 102, a dielectric mirror 104, a light modulating layer 108, and a transparent electrode 110. A suitable drive voltage is applied between the transparent electrodes 100, 110 by a power supply E. The transparent electrode 100 and the photoconductive layer 102 may be spaced from the dielectric mirror 104.

Figure 6:
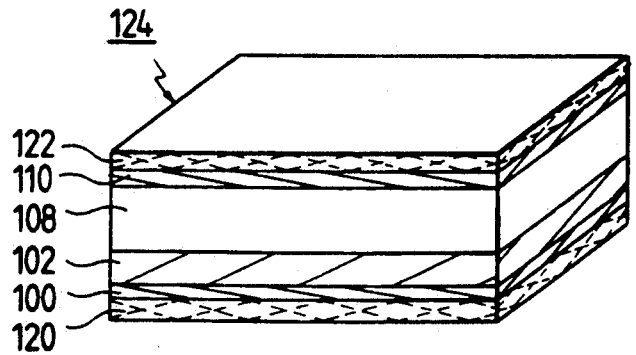

FIG. 6 shows still another light-to-light converter, generally designated by the reference numeral 124, which comprises a photoconductive layer 102 and a light modulating layer 108, and additionally includes color filters 120, 122 which may be of a striped filter pattern, a matrix filter pattern, or the like. Each of these filters 120, 122 may be in the form of a combination of R, G, B filter stripes or dots or a combination of C (cyan), M (magenta), and Y (yellow) filter stripes or dots (see Japanese Patent Application No. 61-310768, for example).

Figure 7:
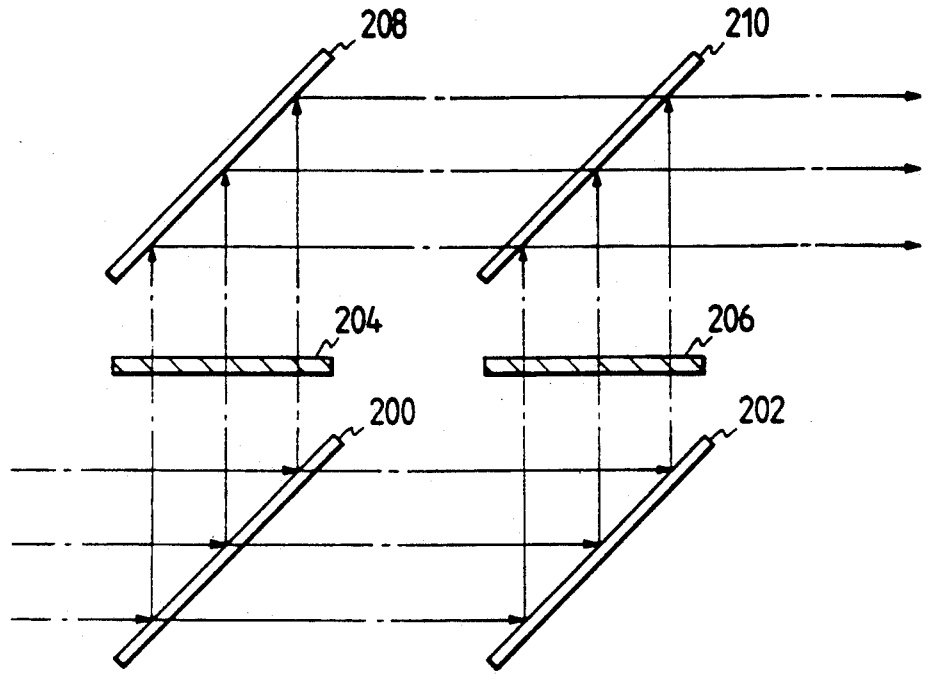
FIGS. 7 and 8 are elevational views of optical arrangements according to different embodiments of the present invention.

FIG. 7 shows an optical arrangement for superimposing a plurality of images when they are projected onto a screen. Light from a light source (not shown) is divided by a beam splitter 200 into light which is applied directly to an object 204 such as a subject copy and light which is applied to an object 206 such as a subject copy by a mirror 202. The light that has passed through the object 204 and the light that has passed through the object 206 are reflected by a mirror 208 and a beam splitter 210, and combined with each other by the beam splitter 210. The combined light is then applied to the light-to-light converter 10, 112, or 124.

Figure 8:
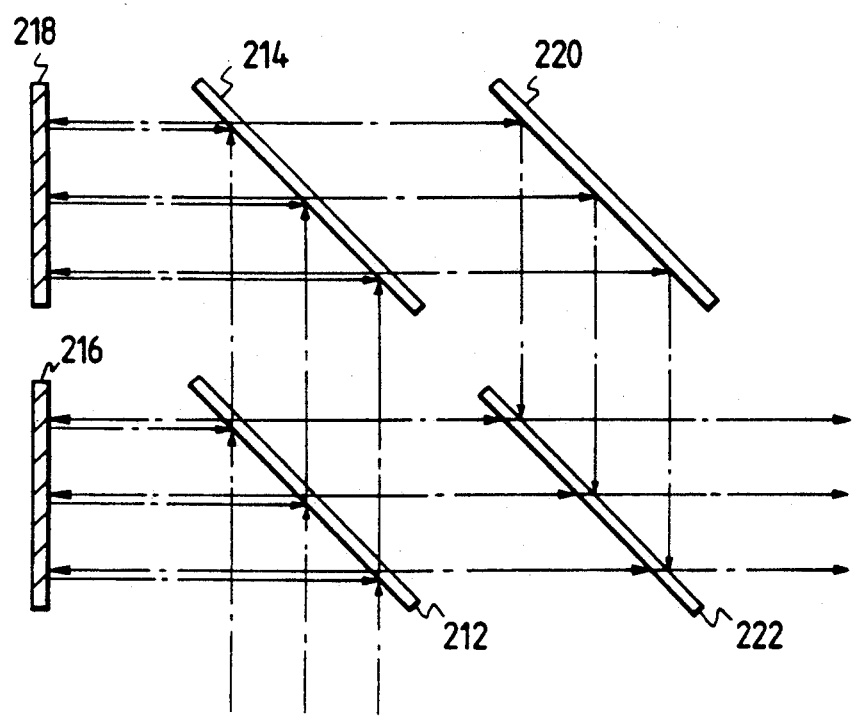

FIG. 8 illustrates another optical arrangement for superimposing a plurality of images when they are projected onto a screen. Light from a light source (not shown) is divided by beam splitters 212, 214, and reflected thereby to illuminate objects 216, 218. The light reflected by the object 218 passes through the beam splitter 214, and is reflected to a beam splitter 222 by a mirror 220. The light reflected by the object 216 passes through the beam splitter 212 and is combined with the light from the mirror 220 by the beam splitter 222. The combined light then goes to the light-to-light converter 10, 112, or 124.

Figure 9:
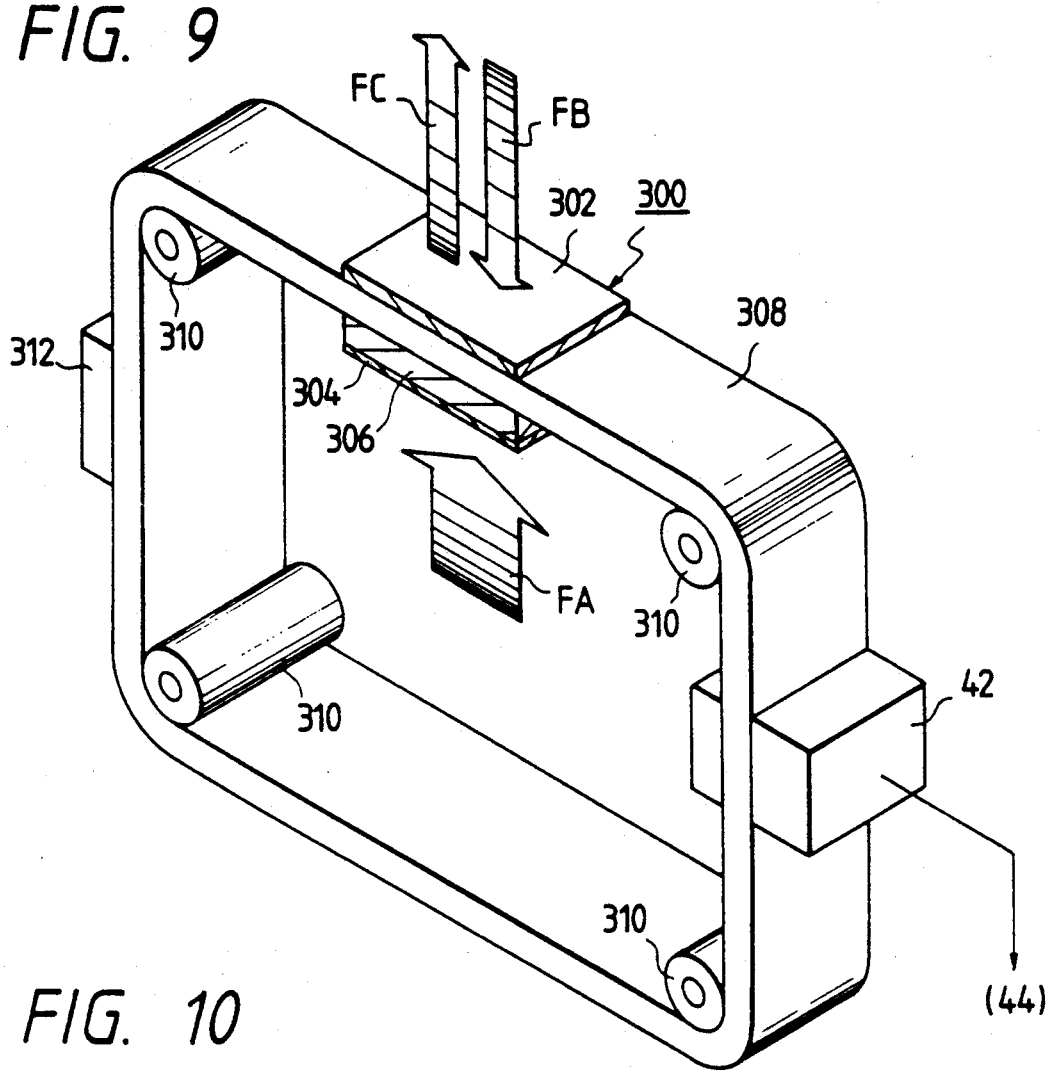
FIGS. 9 and 10 are perspective views of recording mediums according to different embodiments of the present invention.

If the light-to-light converter doubles as a memory, then it may be in the form of an endless web or film as shown in FIG. 9. More specifically, as shown in FIG. 9, a light-to-light converter 300 comprises an endless recording layer 308, a transparent electrode 302 disposed on one side of the recording layer 308, a transparent electrode 304 disposed on the other side of the recording layer 308 in alignment with the transparent electrode 302, and a photoconductive layer 304 attached to the transparent electrode 304 remotely from the recording layer 308. The recording layer 308 is trained around four rollers 310 so that the recording layer 308 circulates along a circulatory path as it moves between the transparent electrodes 302, 306. An erase unit 312 for erasing a recorded image from the recording layer 308 is positioned in a portion of the circulatory path, whereas the read unit 42 for reading a recorded image from the recording layer 308 is positioned in a portion of the circulatory path opposite to the erase unit 312. The erase unit 312 may comprise a linear heater for linearly heating the recording layer 308 or a laser beam source for two-dimensionally scanning the recording layer 308 to heat the same to erase any recorded image from the recording layer as it moves past the erase unit 312. If the recording layer 308 is made of PLZT, however, the erase unit 312 applies an electric field to the recording layer 308 to erase any recorded image therefrom.

Writing light is applied to the recording layer 308 through the photoconductive layer 304 and the transparent electrode 306 as indicated by the arrow FA, thereby writing an image represented by the writing light in the recording layer 308. The recorded image is read from the recording layer 308 by reading light which is applied thereto through the transparent electrode 302 as indicated by the arrow FB. The reading light which is modulated by the recorded image is reflected as indicated by the arrow FC. The region of the recording layer 308 where the image is recorded is transferred to the read unit 42, which can also read the recorded image from the recording layer 308. The image read by the read unit 42 is transmitted to the data processor 44 (see FIG. 4). The recording region of the recording layer 308 is further transferred to the erase unit 312 where the recorded image is erased.

Figure 10:
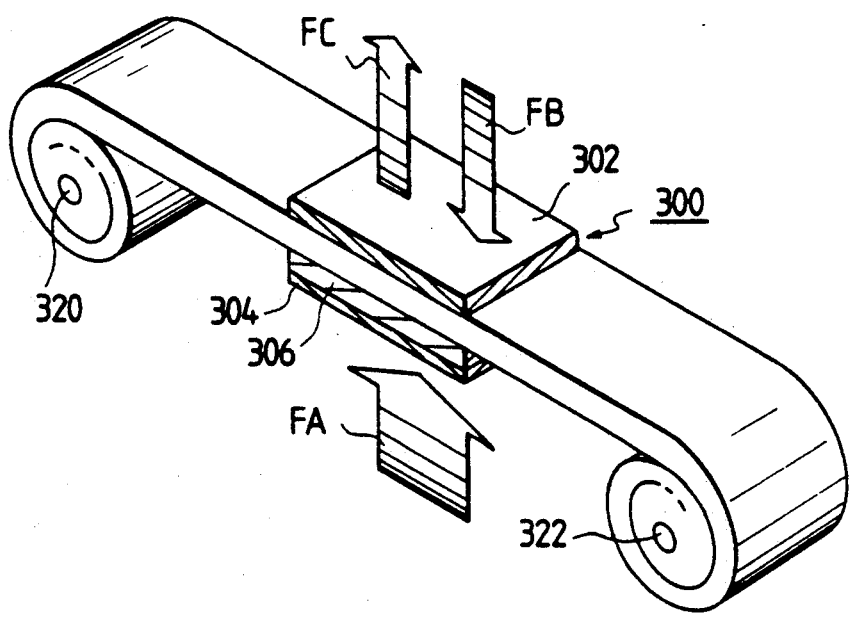

FIG. 10 shows still another light-to-light converter doubling as a memory, which differs from the light-to-light converter shown in FIG. 9 in that a recording layer 308A is not of an endless form, but of a limited length and is wound around supply and takeup reels 320, 322. The light-to-light converter shown in FIG. 10 is suitable for use as an image data storage medium for storing recorded images over a certain period of time.

The light-to-light converters shown in FIGS. 9 and 10 allows images to be written and read at different positions thereon.

Instead of employing the two different light sources in each of the above embodiments shown in FIGS. 1, 3, and 4, a single common light source may be employed, and light emitted thereby may be divided into light beams whose parameters or settings may independently be adjusted or controlled by respective setting adjusting units.

While the light-to-light converter in each of the embodiments is of the reflective type which reflects reading light to read a recorded image, the light-to-light converter may be of the transmissive type which transmits reading light therethrough to read a recorded image.

Although certain preferred embodiments of the present invention have been shown and described in detail, it should be understood that various changes and modifications may be made therein without departing from the scope of the appended claims.

What is claimed is:

1. An overhead projector for projecting an image onto a screen, comprising:
 a light-to-light convertor for recording an image therein and reproducing the recorded image therefrom;
 first means for applying first light to read an image from an object and record the image in said light-to-light converter under a first light applying condition; and
 second means for applying second light to reproduce the recorded image from said light-to-light converter and project the reproduced image onto a screen under a second light applying condition independent of said first light applying condition, wherein said first means comprises a first light source for emitting said first light under said first light applying condition, a first beam splitter for reflecting said first light to said object, and a first optical system for applying said first light reflected by said object to said light-to-light converter, and wherein said second means comprises a second light source for emitting said second light under said second light applying condition, a second beam splitter for passing said second light therethrough to said light-to-light converter, and a second optical system for applying said second light reflected by said light-to-light converter and said second beam splitter to said screen.

2. An overhead projector for projecting an image onto a screen, comprising:
 a light-to-light converter for recording an image therein and reproducing the recorded image therefrom;
 first means for applying first light to read an image from an object and record the image in said light-to-light converter under a first light applying condition;
 second means for applying second light to reproduce the recorded image from said light-to-light converter and project the reproduced image onto a screen under a second light applying condition independent of said first light applying condition; and color separating means for separating said first light from said first optical system into lights of different colors before they are applied to said light-to-light converter, and color combining means for combining the lights of different colors from said light-to-light convertor into said second light before it is applied to said screen.

3. An overhead projector for projecting an image onto a screen, comprising:
 a light-to-light converter for recording an image therein and reproducing the recorded image therefrom;
 first means for applying first light to read an image from an object and record the image in said light-to-light converter under a first light applying condition;
 second means for applying second light to reproduce the recorded image from said light-to-light converter and project the reproduced image onto a screen under a second light applying condition independent of said first light applying condition; and reading means for reading the recorded image from said light-to-light converter, data processing means for processing the image read by said reading means, and recording means for recording the image processed by said data processing means in said light-to-light converter.

4. An overhead projector according to claim 3, further including a memory for storing said processed image.

5. An overhead projector according to claim 3, further including a printer for printing said processed image.

6. An overhead projector according to claim 3, further including a display monitor for displaying said processed image.

7. An overhead projector according to claim 3, further including a shutter for selectively blocking said second light applied by said first means.

8. An overhead projector for projecting an image onto a screen, comprising:
   a light-to-light convertor for recording an image therein and reproducing the recorded image therefrom;
   first means for applying first light to read an image from an object and record the image in said light-to-light converter under a first light applying condition;
   second means for applying second light to reproduce the recorded image from said light-to-light converter and project the reproduced image onto a screen under a second light applying condition independent of said first light applying condition; and optical means for superimposing lights representing images of a plurality of objects into said first light.

9. An overhead projector for projecting an image onto a screen, comprising: a light-to-light convertor for recording an image therein and reproducing the recorded image therefrom;
   first means for applying first light to read an image from an object and record the image in said light-to-light converter under a first light applying condition; and
   second means for applying second light to reproduce the recorded image from said light-to-light converter and project the reproduced image onto a screen under a second light applying condition independent of said first light applying condition, wherein said light-to-light converter comprises a recording layer for recording the image therein, and wherein said recording layer comprises an endless web.

* * * * *